US008352857B2

(12) United States Patent
Filippova et al.

(10) Patent No.: US 8,352,857 B2
(45) Date of Patent: Jan. 8, 2013

(54) METHODS AND APPARATUSES FOR INTRA-DOCUMENT REFERENCE IDENTIFICATION AND RESOLUTION

(75) Inventors: Katja Filippova, Heidelberg (DE); Herve Dejean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 410 days.

(21) Appl. No.: 12/258,627

(22) Filed: Oct. 27, 2008

(65) Prior Publication Data

US 2010/0107045 A1   Apr. 29, 2010

(51) Int. Cl.
   *G06F 17/00* (2006.01)
(52) U.S. Cl. ....................................... 715/256
(58) Field of Classification Search .............. 715/256
   See application file for complete search history.

(56) References Cited

U.S. PATENT DOCUMENTS

| | | | | |
|---|---|---|---|---|
| 5,179,650 | A * | 1/1993 | Fukui et al. | 715/209 |
| 5,905,991 | A * | 5/1999 | Reynolds | 715/234 |
| 6,138,129 | A * | 10/2000 | Combs | 1/1 |
| 6,295,542 | B1 * | 9/2001 | Corbin | 715/205 |
| 7,062,498 | B2 * | 6/2006 | Al-Kofahi et al. | 1/1 |
| 7,225,399 | B2 * | 5/2007 | Watson | 715/210 |
| 7,554,689 | B2 * | 6/2009 | Tonisson | 358/1.18 |
| 2003/0187751 | A1 | 10/2003 | Watson et al. | |
| 2006/0155703 | A1 | 7/2006 | Dejean et al. | |
| 2006/0248070 | A1 | 11/2006 | Dejean et al. | |
| 2007/0028165 | A1 * | 2/2007 | Cole | 715/517 |
| 2007/0196015 | A1 * | 8/2007 | Meunier et al. | 382/190 |
| 2008/0065671 | A1 | 3/2008 | Dejean et al. | |
| 2008/0077847 | A1 | 3/2008 | Dejean | |
| 2009/0307583 | A1 * | 12/2009 | Tonisson | 715/246 |

FOREIGN PATENT DOCUMENTS

WO    0043918    7/2000

OTHER PUBLICATIONS

Nakagawa et al., "Mathematical Knowledge Browser with Automatic Hyperlink Detection," Mathematical Knowledge Management Lecture Notes in Computer Science; Lecture Notes in Artificial Intelligence; Berlin, DE, pp. 190-202, Jan. 2006.
Myka et al., "Automatic hypertext conversion of paper document collections," Digital Libraries Workshop DL '94, Selected Papers Springer-Verlag, Verlin, DE, pp. 1-18, (1995).
Chawla et al., "Learning from Labeled and Unlabeled Data: An Empirical Study Across techniques and Domains," Journal of Artificial Intelligence Research 23, pp. 331-366, (2005).

* cited by examiner

*Primary Examiner* — Doug Hutton, Jr.
*Assistant Examiner* — Shawn S Joseph
(74) *Attorney, Agent, or Firm* — Fay Sharpe LLP (57) ABSTRACT

Reference identification and resolution identifies reference text fragments in a document and associates referenced object text fragments in the document with the identified reference text fragments. Reference profiles are abstracted from the document. Each reference profile specifies at least a reference number and an object type identifier. A reference profile is paired with an object text fragment of the document containing the reference number of the reference profile. The pairing is repeated to associate reference profiles with object text fragments. A reference text fragment of the document satisfying one of the reference profiles is associated with the object text fragment paired with the satisfied reference profile. The associating is repeated to associate reference text fragments of the document with object text fragments.

20 Claims, 2 Drawing Sheets

METHODS AND APPARATUSES FOR INTRA-DOCUMENT REFERENCE IDENTIFICATION AND RESOLUTION

BACKGROUND

The following relates to the information processing arts, document processing and archiving arts, document annotation arts, and related arts.

Documents typically include references to objects within the document (that is, intradocument references). An object may be, for example, a section, a figure, a table, an equation, a footnote, a sidebar, or so forth. Objects are typically identified by a short textual phrase within or near the object. For example, figures are identified by figure captions, tables by table captions, and so forth, while document sections or chapters are typically identified by section or chapter headings. Corresponding references typically make use of the same or similar text as is used in the short identifying textual phrase associated with the object. Thus, for example, a figure may be captioned "Figure 4—Sales Trends. Values for fiscal year 2008", and corresponding references may be of the form "FIG. 4", "Figure 4", or so forth. The combination of a reference and its associated object (as represented by its short identifying textual phrase) is referred to herein as a "reference-object link". It is to be understood that a single object may have one, two, or more corresponding references—for example, the aforementioned "Figure 4" may be referenced at one, two, or more different points within the body text. Some objects such as organizational objects (chapters, sections, or so forth) may have no references.

Reference-object links are of interest in tasks such as document structuring or annotation, where a reference-object link may be converted to an intra-document hyperlink, or modified to employ a uniform object naming convention throughout the document (for example, converting diverse figure type identifications such as "Fig.", "Figure", "figure", and "fig.", to a single uniform type identification such as "Fig."), or so forth.

The automated resolution of reference-object links would be a useful tool for document structuring, annotation, or related tasks. However, automated reference resolution is complicated by the wide range of object types and object type identifications employed in various documents. Moreover, because the same identifying information is commonly used both as the reference(s) and as the short identifying textual phrase associated with the object, it is sometimes difficult to discern whether a given text fragment is a reference or the object identification. For example, identifying an occurrence of the short textual phrase "Figure 4" in the document does not, by itself, determine whether the identified occurrence is a reference to a figure numbered "4" (that is, a reference) or a caption of a figure numbered 4 (that is, an object). Reliance upon keywords commonly used in references and object identifications is also problematic. For example, if the document undergoing annotation or structuring is a specialized domain-specific document such as a scientific article, technical manual, or so forth, then the set of expected keywords may fail to encompass the references and object identifications used in the specialized domain-specific document.

It would therefore be desirable to develop reference-object links resolution systems and methods that overcome the aforementioned disadvantages and others. It would further be desirable to develop systems such as document structuring and/or annotation systems and the like incorporating such reference-object links resolution systems and methods to facilitate automated or semi-automated document structuring or annotating or other document processing.

BRIEF DESCRIPTION

In some illustrative embodiments disclosed as illustrative examples herein, a reference identification and resolution method is disclosed for (i) identifying reference text fragments in a document and (ii) associating referenced object text fragments in the document with the identified reference text fragments, the method comprising: deriving reference profiles from the document, each reference profile including at least a reference number and an object type indicator; identifying candidate object text fragments from the document, each candidate object text fragment including a reference number; pairing reference profiles with object text fragments selected from the candidate object text fragments, each reference profile-object text fragment pair having a same reference number for the paired reference profile and object text fragment; and resolving at least some references in the document by a process including associating a reference text fragment in the document that matches the reference number and object type indicator of a reference profile with the object text fragment paired with the matching reference profile.

In some illustrative embodiments disclosed as illustrative examples herein, a document annotation or structuring system is disclosed, comprising: a reference identification and resolution module including a digital processor configured to identify reference text fragments in a document and associate referenced object text fragments in the document with the identified reference text fragments using a method comprising (a) deriving reference profiles from the document each including at least a reference number and an object type indicator, (b) identifying candidate object text fragments from the document each including a reference number, (c) pairing reference profiles with object text fragments selected from the candidate object text fragments, each pair having a same reference number for the paired reference profile and the object text fragment, (d) matching reference text fragments in the document with reference profiles by reference number and object type, and (e) associating matched reference text fragments with object text fragments paired with the matching reference profiles; and a document annotation or structuring module configured to annotate or structure the document based on the reference text fragments and referenced object text fragments output by the reference identification and resolution module.

In some illustrative embodiments disclosed as illustrative examples herein, a storage medium is disclosed that stores instructions executable by a digital processor to perform reference identification and resolution to identify reference text fragments in a document and associate referenced object text fragments in the document with the identified reference text fragments using a method comprising: abstracting reference profiles from the document, each reference profile specifying at least a reference number and an object type identifier; pairing a reference profile with an object text fragment of the document containing the reference number of the reference profile; repeating the pairing to associate reference profiles with object text fragments; associating a reference text fragment of the document satisfying one of the reference profiles with the object text fragment paired with the satisfied reference profile; and repeating the associating to associate reference text fragments of the document with object text fragments.

DETAILED DESCRIPTION

Figure 1:
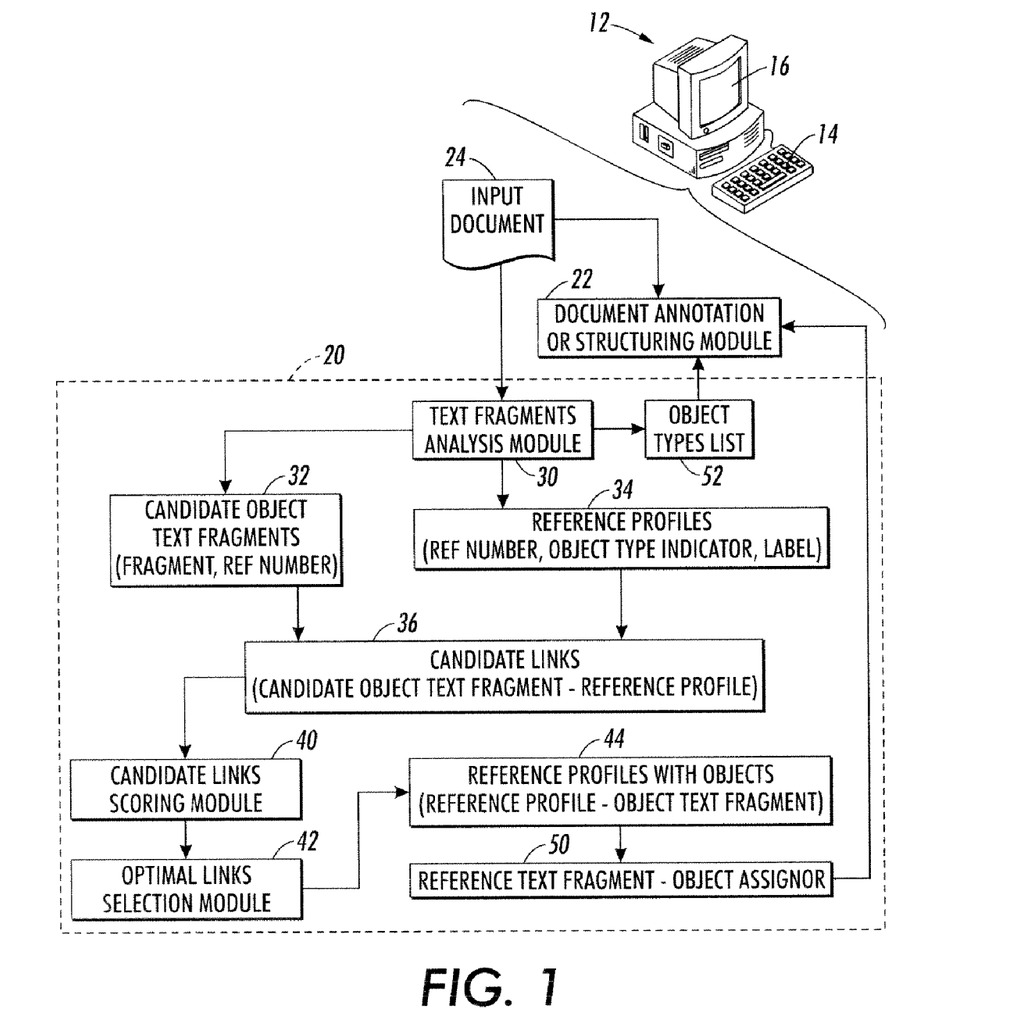
FIG. 1 diagrammatically shows a document annotation system employing a reference-object links resolution subsystem.

With reference to FIG. 1, a document annotation system is described. The document structuring or annotation system is suitably embodied by a computer 12 or other digital processing device including a digital processor such as a microprocessor, microcontroller, or so forth, a keyboard 14, mouse (not illustrated), or other user input device for receiving manual annotation commands or operation requests, and a display 16 for displaying the document undergoing annotation or structuring. The illustrated document annotation or structuring system includes a reference identification and resolution module 20 that is utilized by a document annotation or structuring module 22 in annotating or structuring an input document 24. The disclosed reference identification and resolution embodiments are suitably employed in a document annotation system to provide hyperlinks or other annotations linking references with referenced objects, or in a document structuring system to provide identification of objects and intradocument links to objects, or in other applications.

In some embodiments, the disclosed reference identification and resolution module 20 or application system 20, 22 employing same 20 is embodied by a storage medium storing instructions executable by a digital processor (such as the illustrated computer 12, or an Internet server, or a local area network server, or so forth) to implement one or more embodiments of the reference identification and resolution techniques disclosed herein. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

With reference to FIG. 1, the document annotation or structuring system illustrated herein as an example includes the computer 12 programmed or otherwise configured to implement modules 20, 22 that process a document 24 to perform document annotation or structuring or so forth. The input document 24 is a text-based document that optionally includes non-text objects such as figures or equations, and optionally includes textual or hybrid objects such as chapters, sections, sidebars, tables, or so forth. The input document 24 is text based and accordingly includes textual content that is fragmented into sentences, textual lines on a page, or text fragments of other dimensions so as to facilitate processing. For example, the input document 24 may be a shallowly structured XML document in which each line or sentence of text is a terminal element of the XML structure.

The reference identification and resolution module 20 operates on the following referencing model. Each object is represented in the input document 24 by an object text fragment containing at least a reference number optionally immediately preceded by an object type identifier (for example, "Fig. 4" for an object enumerated by the reference number "4" of the figure type; "Section IV" for an object of the section type enumerated by the reference number "IV"; "Table B" for an object of the table type enumerated by the reference number "B"; and so forth). The term "reference number" is intended to denote an ordering parameter, which may be an Arabic number, a Roman numeral, an alphabetic letter (e.g. the "B" in "Table B"), an alphanumeric enumerator (e.g., "Fig. 4A"), or so forth. The reference number should provide a defined ordering, such as "1, 2, 3, . . . " in the case of Arabic reference numbers, or "A, B, C, . . . " in the case of alphabetic reference numbers, or so forth. The object text fragment is generally not the object itself, but is the linking point (or, at least, a suitable linking point) for linking to the object using a hyperlink or other suitable linking configuration. For example, the object text fragment "Section IV" does not embody the object (which is a section of text in this case) but rather serves as a suitable linking point (header, in this case) for linking to the object (the section of text, in this case). Similarly, "Fig. 4" does not denote the object (which is a typically figure embodied as a bitmap or the like) but rather serves as a suitable linking point to the figure object.

In the model, each reference is represented in the input document 24 as a reference text fragment including a reference number immediately preceded by an object type identifier. The reference number contained in the reference text fragment is identical with the reference number contained in the object text fragment that is referenced by the reference. The object type identifier should also be identical with the object type identifier contained in the corresponding object text fragment, if the object text fragment includes an object type identifier.

The object text fragment, the reference text fragment, or both, may also include further text which, if present, has a likelihood of being descriptive of the object. This additional text is referred to herein as a label. For example, in "Fig. 4—Projected sales" the phrase "Projected sales" is a label.

Figure 2:
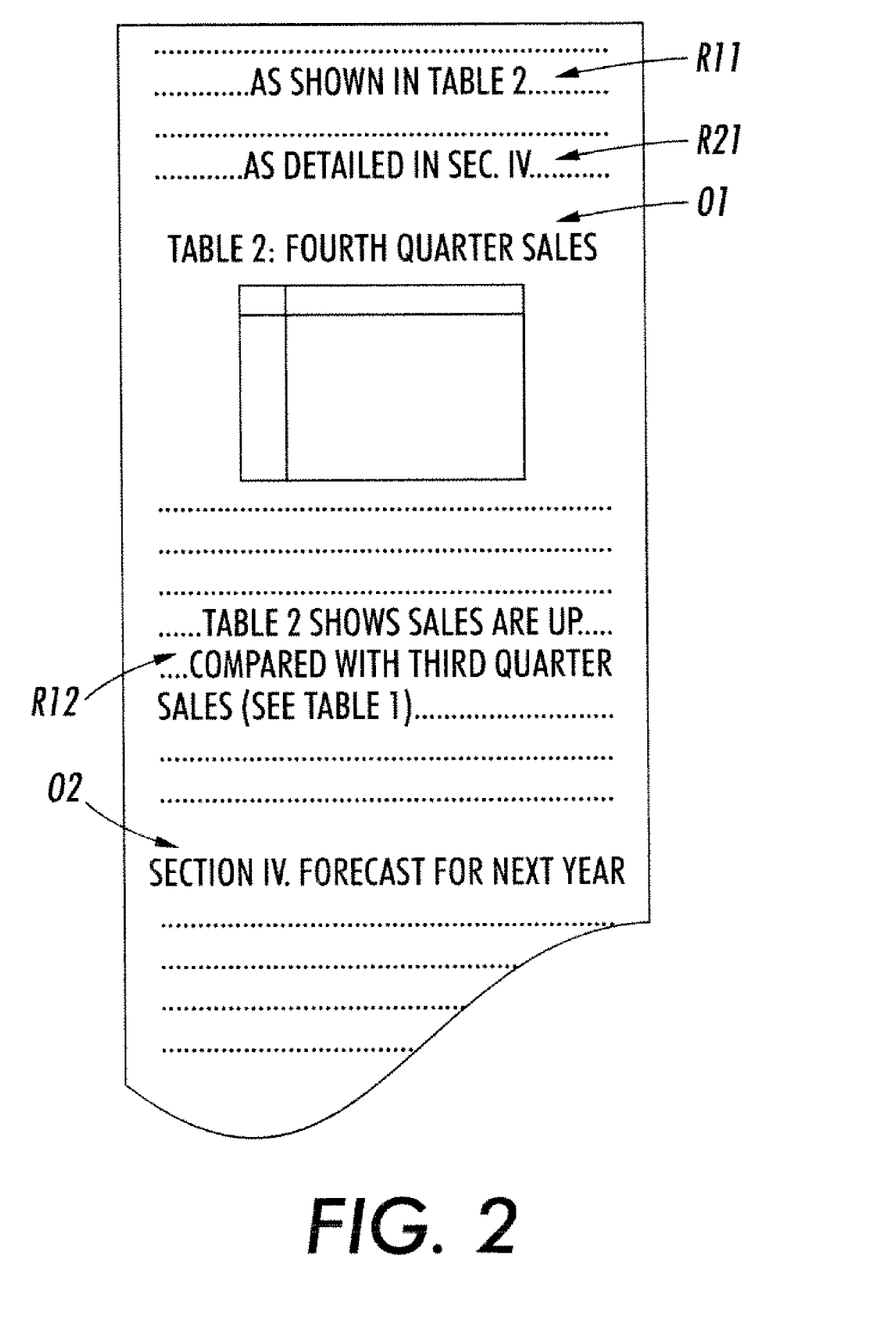
FIG. 2 diagrammatically shows some illustrative object text fragments and corresponding reference text fragments in a diagrammatic document.

With brief reference to FIG. 2, a page of a document is diagrammatically illustrated to show some illustrative object text fragments and corresponding reference text fragments. A first object text fragment O1 comprises the text fragment "Table 2: Fourth Quarter Sales", and is referenced by a first reference text fragment R11 comprising the text "Table 2" and by a second reference text fragment R12 also comprising the text "Table 2". A second object text fragment O2 comprises the text fragment "Section IV. Forecast for next year", and is referenced by a reference text fragment R21 comprising the text "Sect. IV". Note that the tokens "Section" and "Sect." both denote the same underlying object type (a section), but use different surface forms.

Each reference text fragment references an object. A given reference text fragment references a single object. However, a single object may be referenced by a plurality of reference text fragments. This is seen in FIG. 2, where the single object indicated by object text fragment O1 is referenced by two reference text fragments R11, R12.

The referencing model used herein will not recognize an unenumerated reference, such as "See the next section", which does not include a reference number. The referencing model used herein does not place any a priori constraints on the object type identifier. Rather, as disclosed herein the object type identifiers used in the input document 24 are derived endogenously from the document 24 itself. As a result, the reference identification and resolution module 20 is generally able to identify references of unusual types not regularly encountered, such as equations, lemma expressions, proposition expressions, and other specialized mathematical expressions, remarks, theorems or other specialized scientific or engineering expressions, and so forth. Optionally, a priori constants can be placed on the object type identifiers. For example, if the document format is known a priori, the object type identifiers can be limited to a list of allowed object type identifiers.

With returning reference to FIG. 1, the reference identification and resolution module 20 operates using the following procedure. Reference profiles are derived from the document 24, where each reference profile includes at least a reference number and an object type indicator. A given profile may encompass one reference text fragment, or may encompass a plurality of reference text fragments. Candidate object text fragments are identified from the document 24. Each candidate object text fragment includes a reference number, and may or may not include an object type indicator. In the reference identification and resolution module 20 of FIG. 1, a text fragments analysis module 30 performs the processing that identifies candidate object text fragments 32 and reference profiles 34. The reference profiles are then paired with object text fragments selected from the candidate object text fragments. Each reference profile-object text fragment pair has a same reference number for the paired reference profile and object text fragment. In the reference identification and resolution module 20 of FIG. 1, candidate links 36 (each of which includes a reference profile paired with a candidate object text fragment both of which have the same reference number and, if applicable, the same object type identifier) are processed by a candidate links scoring module 40 and an optimal links selection module 42 to generate reference profiles with associated objects (represented by object text fragments) 44. At least some references in the document 24 are resolved by a process including associating a reference text fragment in the document 24 that matches the reference number and object type indicator of a reference profile with the object text fragment paired with the matching reference profile. In the reference identification and resolution module 20 of FIG. 1, a reference text fragment-object assignor 50 matches reference text fragments with reference profiles of the reference profiles 44 and thence with the corresponding object text fragments.

The resulting reference text fragment-object text fragment pairs output by the reference identification and resolution module 20 of FIG. 1 are suitably input to the document annotation or structuring module 22 for use in document annotation or structuring. For example, in an automated document annotation process each reference text fragment-object text fragment pair can be used to create a hyperlink from the reference text fragment to the object text fragment, where a hyperlink is broadly defined herein as any mechanism by which a pointing device applied to the reference text fragment causes a transfer of the point of interest, cursor position, focus, or the like to the corresponding object text fragment. Such hyperlinks can be constructed using HTML tagging of the form <a href="{pointer to object text fragment}">{reference text fragment}</a>, or can be formulated using another tagging formalism or other representational form. Additionally or alternatively, the object type identifiers of the reference profiles can be used to construct an object types list 52 that can be used in annotating or structuring the document. For example, the document can be structured by: (i) defining objects corresponding to the reference profiles which are ordered within the document by the reference numbers of the reference profiles and typed based on the object type identifiers of the reference profiles; and (ii) linking the defined objects with the associated reference text fragments based on the associating performed by the reference identification and resolution module 20.

In some embodiments, the document annotation or structuring system further includes a user interface, for example defined in the illustrated embodiment by the computer 12, having the display 16 for displaying the document 24 with annotations including the defined hyperlinks, and further having one or more input devices (such as the keyboard 14, and/or a mouse, trackball, or other pointing device, or so forth) for receiving annotations input by a user. The user interface enables the user to modify or delete the hyperlinks defined automatically by the document annotation or structuring module 22 based on the references resolved by the reference identification and resolution module 20, and also enables the user to add new intradocument hyperlinks, and add or modify other annotations such as comments, interdocument hyperlinks (that is, links to documents outside of the input document 24), or so forth.

Having provided a general overview of the reference identification and resolution module 20 of FIG. 1, some additional illustrative aspects, details, variations, and so forth are addressed.

The text fragments analysis module 30 automatically extracts text fragments of interest (that is, text fragments that are candidates for being identified as either object text fragments or reference text fragments) based on the reference number contained in the text fragment. Object or reference text fragments are matched to the pattern <object type identifier>SEP<reference number> where SEP is a whitespace character or other separator; that is, the expected pattern includes an object type identifier followed by a reference number, such as in the text fragment: "Section 4".

Reference numbers are identified by matching alphanumerical patterns, regular expressions, or other suitable reference number pattern identification techniques. The word (or, more generally, the token) preceding a reference number then is considered to be an object type identifier. A threshold may be applied in order to delete or omit object type identifiers with low frequency or low count, so as to reduce noise. That is, in order to reduce noise, in some embodiments only a token that precedes a reference number a threshold number of times in the document 24 is considered to be an object type identifier. Another approach to noise reduction is to limit object type identifiers to those tokens preceding a reference number that are also included in an a priori provided list of allowable object type identifiers. Moreover, in some instances the reference number may be the leftmost token in the text fragment: for example, a chapter may have the heading: "1. Introduction". In such cases, there is no object type identification. In general, while some extracted text fragments are expected to include object type identifiers, some extracted text fragments may have no object type identifier.

Each text fragment may be a reference text fragment or an object text fragment. In either case, it is modeled as a triple of the form <reference number>, <object type identifier>, <label>. The elements <reference number>, <object type identifier> are readily detected as just described, by pattern matching the reference number and taking the immediately preceding token as the object type identifier (optionally filtered based on occurrence frequency, matching to an a priori provided list of allowable object type identifiers, or so forth). The label then corresponds to textual content of the text fragment other than the text making up the reference number and preceding object type identifier. The content of the label depends upon how the text fragment is extracted, for example as a physical line of text on a page, or as a sentence delineated by a capitalized starting token and an ending punctuation mark such as a period, question mark, or the like, or as a more structured block of text such as a paragraph, or so forth. Optionally, the label is generated by applying some filtering or other processing to the textual content, such as deleting stopwords, limiting the label to a selected distance from the <object type identifier>SEP<reference number> pattern (for example, taking the label as the ordered sequence of tokens within 3 tokens to the left or right of the pattern), or so forth.

The text fragments extraction process generates a list of text fragments each of which includes at least a reference number. The text extraction process does not differentiate between object text fragments and reference text fragments. Rather, each text fragment could be an object text fragment, or could be a reference text fragment. In some embodiments, reference text fragments are required to contain both a reference number and a preceding object type identifier, such as "Section 3". In some embodiments, it is also contemplated to require that object text fragments also contain both a reference number and a preceding object type identifier, although such an approach can be overly restrictive in that it may miss object text fragments such as "1. Introduction".

Semantically, it is possible for a reference text fragment to reference two or more different objects. An example is the reference text fragment: "see Figures 1 and 3". The pattern <object type identifier>SEP<reference number> is not able to capture the reference to figure 3, although it will capture the reference to figure 1. Optionally, the pattern is extended to account for multiple references, for example using the pattern <object type identifier>SEP<reference number>COORD<reference number> where COORD can correspond to specific words and punctuation marks such as "and" or "or". In some embodiments, COORD is satisfied by any string between two reference numbers. A reference that references two or more objects (if recognized using a pattern including COORD or the like) is suitably treated as two separate reference text fragments: for example, "see Figures 1 and 3" can be decomposed into the reference text fragment "Figure 1" and the reference text fragment "Figure 3".

Another issue is that object type identifiers referring to the same object type may employ two or more different surface forms. For example, a figure indexed by the reference number "5" may be denoted as "Figure 5", "Fig. 5", "FIG. 5", or so forth. The tokens "Figure", "Fig.", "FIG", and so forth are different surface forms of the underlying object type denoting a figure. Typically, a single surface form is used for all the reference text fragments referencing objects of a given object type, and the same or a different surface form is used for the corresponding object text fragment. Thus, it may be expected that at least two different surface forms may be encountered for a single object type. Some documents may also fail to use a uniform surface form for all the references, so that three or even more different surface forms may be encountered for a single object type.

To address this problem, object type identifiers of different surface forms can be normalized to a single surface form. For example, the surface forms "Figure 5", "Fig. 5", and "FIG 5" can be normalized to "fig 5". Normalization can be done by performing an edit-distance between strings and merging strings that are close, or by a heuristic such as (i) convert all letters of the token preceding the reference number to lowercase; (ii) remove any non-letter characters from the token preceding the reference number; and (iii) normalize to the set of leftmost characters that are common in all similar tokens preceding the same reference number. Applying this heuristic to the surface forms "Figure 5", "Fig. 5", and "FIG 5" provides normalization to "fig 5". In yet another normalization approach, a lexicon or electronic dictionary is reference to identify different surface forms for the same underlying object type. In still yet another normalization approach, if an a priori list of allowable object type identifiers is provided then this list can specify the various allowable surface forms and dictate a chosen normalization.

The text fragment extraction process can be applied on a per-document basis. On the other hand, if the input document 24 comprises a collection of documents known or expected to use similar formatting (that is, same object types and object type identifiers, common reference numbering schemes, and so forth) then the text fragment extraction process can be applied at the collection level. The text fragment extraction process optionally performs endogenous object type identifier extraction as described herein, which allows for collecting object types specific to the input document 24 (which, again, may be a collection of similar documents). Although the endogenous object type identifiers extraction has certain advantages, it is also contemplated to employ a priori constraints on the object type identifier, such as limiting the object type identifiers to a list of allowed object type identifiers.

If an a priori list of allowable object type identifiers is not provided, then the text fragments extraction process performed by the text fragments analysis module 30 can be used to generate the object types list 52, which comprises all the different object type identifiers extracted by the module 30 for the document 24. To illustrate the effectiveness of the disclosed endogenous object type identifiers extraction for generating the object types list 52, a list of types was extracted from a collection of scientific articles using an actually constructed embodiment of the text fragments analysis module 30. The list of object types included: "algorithm", "assumption", "case", "chapter", "definition", "equation", "example", "figure", "lemma", "part", "proposition", "remark", "result", "section", "step", "table", and "theorem". It will be appreciated that some of these object types, such as "lemma", are highly domain-specific, and might not be included in an a priori provided list of expected object types. Accordingly, the endogenous object type identifiers extraction disclosed herein is readily applied to specialized domain-specific documents and document collections.

The text fragments extraction process generates a set of extracted text fragments represented by triplets of the form <reference number>, <object type identifier>, <label>. Of the three triplet elements, only the reference number is required for any given extracted text fragment. The object type identifier may be missing from a given extracted text fragment either because the reference number has no immediately preceding token in the text fragment (that is, the reference number is the leftmost token in the text fragment) or because thresholding, filtering, or other processing has prevented the token immediately preceding the reference number from being deemed an object type identifier. The label may be omitted from any given extracted text fragment.

The text fragments extraction process generally does not provide enough information to determine whether a given extracted text fragment is a reference text fragment or an object text fragment. Accordingly, the extracted text fragments are analyzed to distinguish object text fragments and reference text fragments. The approach used herein is based on the assumption that there is only one object text fragment having a given combination of reference number and object type. On the other hand, there may be zero, one, two, or more reference text fragments having the given combination of reference number and object type, all of which reference the same object. Accordingly, the approach taken by the illustrated text fragments analysis module 30 is to include all extracted text fragments in the set of candidate object text fragments 32, and to generate reference profiles 34 representative of possible reference text fragments. For example, if there are five extracted text fragments that contain "Fig. 5" (or another surface form equivalent to "Fig." followed by "5"), then (i) all five extracted text fragments are included in the set of candidate object text fragments 32, and (ii) the five extracted text fragments are "merged" to generate a reference profile of the form <fig>SEP<5> where <fig> denotes an object type identifier having a surface form denoting the underlying figure object type, and <5> denotes the reference number.

The set of candidate object text fragments 32 and the set of reference profiles 34 can be linked in various ways to generate the candidate links 36. Each link should have a common reference number and, where determinable, a common object type. For the previous example of five extracted text fragments each containing "Fig. 5" or another surface form thereof, there are five possible links. The five possible links correspond to a link of each candidate object text fragment with the single reference profile representing the five text fragments containing "Fig. 5" or another surface form thereof. As an illustrative example, the five extracted text fragments may be:

"Fig. 5 plots last quarter results."
"Figure 5—Fourth Quarter Results"
"see Fig. 5"
"as shown in Fig. 5"
"Fig. 5 should be compared"

which may be represented with the object type identifier normalized to "fig" using the triplet representation <reference number>, <object type identifier>, <label> as:

"5", "fig", "plots last quarter"
"5", "fig", "Fourth Quarter Results"
"5", "fig", "see"
"5", "fig", "as shown in"
"5", "fig", "should be compared"

where the label is limited to the nearest three tokens on either side of the pattern <object type identifier>SEP<reference number>. Each of these five text fragments is considered to be a candidate object text fragment. A reference profile of the form "5", "fig", <profile_label> is extracted from the five text fragments. (Construction of <profile_label> for the reference profile is discussed elsewhere herein). These five text fragments therefore contribute five candidate links, namely:

d("5", "fig", <profile_label>; "5", "fig", "plots last quarter")
d("5", "fig", <profile_label>; "5", "fig", "Fourth Quarter Results")
d("5", "fig", <profile_label>; "5", "fig", "see")
d("5", "fig", <profile_label>; "5", "fig", "as shown in")
d("5", "fig", <profile_label>; "5", "fig", "should be compared")

where the notation used herein is d(i,j) where index i denotes a reference profile and index j denotes a candidate object text fragment.

A suitable approach for generating a reference profile is as follows. In this approach, it is required that all reference text fragments include the object type identifier. Therefore, a reference profile is generated from a set of one or more text fragments each including the same known value for reference number and the same known value for object type identifier (after suitable normalization of any variation in surface forms). The reference profile is assigned the reference number and the normalized object type identifier of its constituent text fragments, which leaves only the profile label element of the triplet, denoted <profile_label> in the illustrative example, to be determined. Various approaches can be used for determining the profile label, such as: (i) selection of a "best" label from the set of available labels of the constituent text fragments; or (ii) combination or merging of the labels of the constituent text fragments to generate a representative value for the profile label. For approach (i), the "best" label can be chosen based on any suitable criterion, such as the longest label of the constituent text fragments, or a criterion that places weight on capitalization (assuming that capitalized text in a text fragment is likely to be concisely descriptive), or so forth. For approach (ii), various combination or merging techniques can be used, such as: using a set of words weighted based on frequency of occurrence in the labels of the constituent text fragments; scoring methods such as are used in Information Retrieval; simple concatenation of all tokens in the labels of the constituent text fragments; or so forth.

The candidate links 36 are processed by the candidate links scoring module 40 and the optimal links selection module 42 to identify the reference profiles with associated object text fragments 44. The candidate links 36 include all pairwise compatible links. A reference profile and candidate object text fragment are compatible if they have the same reference number and the same (normalized) object type identifier. An object text fragment that does not include an object type identifier is suitably considered to be compatible with any reference profile having the same reference number as the object text fragment.

The scoring module 40 scores the candidate links 36 based on a suitable scoring criterion. The scoring of a link d(i,j) (where i is the reference profile and j is the candidate object text fragment) assesses the likelihood that i models a reference or references, the likelihood that j is an object text fragment, and the likelihood that the reference profile i references the object text fragment j. Some suitable scoring criteria are as follows: (i) context similarity—a similarity measure is computed between the labels of the reference profile and the candidate object text fragment; (ii) length—the length in characters of the label of the object j is considered; (iii) distance—the distances in the document 24 between the reference text fragments defining the reference profile i the and the candidate object text fragment j are averaged or otherwise measured; (iv) relative positions of object type identifiers and reference numbers in a line of text—for example, a line beginning with an object type identifier followed by a reference number is likely to label an object (that is, likely to be an object text fragment); (v) number of extracted text fragments in a unit of text—for example, if two or more extracted text fragments are present in a single sentence, line, or paragraph of text, they are likely to be reference text fragments rather than object text fragments, whereas, if the extracted text fragment is the only one in a sentence, line, or paragraph, then it is more likely to be an object text fragment; and (vii) extracted text fragments written in the most common typeface are more likely to be reference text fragments, whereas, extracted text fragments written in less common typeface (such as boldface) are more likely to be object text fragments. These are merely illustrative scoring measures or criteria, and they may be variously combined and/or different scoring criteria included. In some actually constructed embodiments, the criteria (i), (ii), and (iii) were used, with the final score for a link d(i,j) computed according to the formula:

$$\text{Score}(i,j) = \text{scoreRef}(i) * \text{scoreDO}(j) * \text{scoreLink}(i,j).$$

where scoreRef(i) denotes a score component pertaining to the reference profile (i) alone, scoreDO(j) denotes a score component pertaining to the candidate object text fragment (j) alone, and scoreLink denotes a score component pertaining to whether the candidate object text fragment (j) is the object of the reference profile (i). In computing Score(i,j) any available information is optionally incorporated. For example, if the document 24 is partially structured so as to indicate figure captions, this information may be used to set scoreDO(j)=<max> for extracted text fragments that are identified as figure captions by the document structuring (where <max> denotes a value indicating a maximal probability or certainty that the text fragment j is an object text fragment).

The scores assigned to the candidate links 36 by the scoring module 40 provide information for resolving references. However, in some applications the scores are not sufficient, by themselves, to resolve references with desired reliability. Accordingly, in the illustrated embodiment the optimal links selection module 42 employs a simultaneous solution algorithm to resolve references by assigning a unique object text fragment to each reference profile. The selection module 42 optimizes the object text fragment assignments to maximize the scores under selected constraints. In some embodiments, the constraints include: (1) no reference profile is paired with more than one object text fragment and (2) no object text fragment is paired with more than one reference profile. Optionally, another constraint is applied, namely that object text fragments paired with reference profiles of a given object type indicator be ordered in the document by their reference number. Additional or different constraints can also be used, such as a constraint that the format of document objects of the same object type (as indicated by the object type indicators) be similar as measured by a suitable similarity metric.

In an illustrative embodiment described next, these constraints are represented using a mathematical formalism in which each link is of the form d(i,j) where i indexes a reference profile and j indexes a candidate object text fragment. In the illustrative embodiment, the constrained optimization is performed using integer linear programming, although other constraint-based frameworks can also be used. The integer linear programming operates on binary variables of the form $x_{i,j}$ where $x_{i,j}=1$ indicates that the reference profile i is resolved to reference object text fragment j and $x_{i,j}=0$ otherwise. All variables are ordered sorted according to their position in the input document 24 such that $\forall i,k,j,l: i<j \Rightarrow pos(x_{i,j}) < pos(x_{k,l})$ where the function pos( ) denotes position in the document 24. The constraint that no reference profile is paired with more than one object text fragment is suitably codified as $$\forall i: \sum_j x_{i,j} \leq 1.$$

The constraint that no object text fragment is paired with more than one reference profile is similarly codified as $$\forall i: \sum_j x_{i,j} \leq 1.$$

The constraint that object text fragments paired with reference profiles of a given object type indicator be ordered in the document by their reference number is suitably codified as $$\forall i, k = i - 1: \sum_j (pos(x_{i,j}) \times x_{i,j}) - \sum_j (pos(x_{k,j}) \times x_{k,j}) \geq 0.$$

The constraint that the format of document objects of the same object type (as indicated by the object type indicators) be similar is suitably codified as $$\forall i, k = i + 1: \sum_j (format(x_{i,j}) \times x_{i,j}) - \sum_j (format(x_{k,j}) \times x_{k,j}) = 0$$

where format( ) is a function measuring of the format of the text fragment as an integer value. In this latter constraint, the presence of different punctuation signs such as dot, comma, square brackets, or so forth, is encoded as a power of 2 which are then summed.

The output of the integer linear program is the set of reference profiles with associated object text fragments 44. The reference text fragment-object assignor 50 resolves references using this information. In suitable illustrative processing, the assignor 50 matches a reference text fragment with one of the reference profiles. In this analysis, any text fragment extracted by the text fragments analysis module 30 that includes an object type identifier and that is not determined to be an object text fragment by the selection module 42 qualifies as a reference text fragment. Matching with a reference profile entails identifying the reference profile having the same reference number and object type identifier as the reference text fragment under consideration. Once a match is found, the reference is resolved by associating the reference text fragment with the object text fragment assigned to the matching reference profile. This process is suitably repeated for each reference text fragment to resolve the references.

The output of the reference text fragment-object assignor 50 is suitably input to the document annotation or structuring module 22. For example, the document annotation or structuring module 22 optionally creates hyperlinks from reference text fragments to corresponding assigned object text fragments. It will be appreciated that not all references are necessarily resolved. For example, unenumerated references (e.g., "see the next section") that have no reference number are not resolved. Similarly, objects that are not referenced in the text, or that are only referenced using unenumerated referencing, will not be identified.

In some embodiments, the document annotation or structuring module 22 performs semi-supervised annotation or structuring, in which additional annotation or structuring inputs are provided by a user via the keyboard 14 or another user input device. The user can review the annotations on the display 16, and can modify or delete the hyperlinks defined based on the resolved references, and/or add new intradocument hyperlinks for any references that are not resolved by the reference identification and resolution module 20, and/or can add new interdocument hyperlinks that define pointers from the document 24 undergoing annotation to an external document, and/or can add notes or other textual annotations, and/or can add embedded object annotations, or so forth. The reference identification and resolution module 20 provides an at least partially annotated document that the user can improve upon using semi-supervised manual updating, or by semi-supervised learning of categorization of document objects and references, or so forth. For example, semi-supervised learning of categories can employ the output of the reference identification and resolution module 20 as classification annotations defining a training set, and a categorizer can be trained using this data to provide more accurate categorization based on features such as typographical or positional information of the different document elements, such as typeface, size, and so forth, that are not utilized by the reference identification and resolution module 20.

The reference identification and resolution techniques disclosed herein are advantageously general, in that they do not rely upon domain-specific information. As already noted, for example, these techniques can perform endogenous extraction of object types, enabling reference resolution for specialized documents employing non-standard objects and reference notation.

At the same time, the reference identification and resolution techniques disclosed herein readily utilize additional domain-specific information when available. For example, as already noted an a priori known list of allowable object type identifiers can be utilized to enhance robustness. Similarly, structural information from the document 24, if available, can be used to define or adjust the scores assigned by the candidate links scoring module 40 to utilize such structural information to enhance robustness.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A reference identification and resolution method for (i) identifying reference text fragments in a document and (ii) associating referenced object text fragments in the document with the identified reference text fragments, the method comprising:
   identifying a set of candidate text fragments from the document, each candidate text fragment including at least a reference number, the set of candidate text fragments including both object text fragments and reference text fragments, the identifying not differentiating between object text fragments and reference text fragments;
   deriving reference profiles from the set of candidate text fragments, each reference profile including at least a reference number and an object type indicator;
   pairing reference profiles with object text fragments selected from the set of candidate text fragments, each reference profile-object text fragment pair having a same reference number for the paired reference profile and object text fragment, wherein the pairing comprises:
      assigning likelihood scores to candidate reference profile-candidate text fragment pairs, each candidate reference profile-candidate text fragment pair having a same reference number for the paired reference profile and candidate text fragment, and
      selecting the reference profile-object text fragment pairs from the candidate reference profile-candidate text fragment pairs based on the assigned likelihood scores and subject to constraints including at least (1) no reference profile is paired with more than one object text fragment and (2) no object text fragment is paired with more than one reference profile; and
   resolving at least some references in the document by a process including associating a reference text fragment in the document that matches the reference number and object type indicator of a reference profile with the object text fragment paired with the matching reference profile;
   wherein the deriving, identifying, pairing, and resolving are performed by a digital processor.

2. The reference identification and resolution method as set forth in claim 1, wherein the deriving further comprises:
   labeling the reference profiles with labels representative of textual content of text fragments matching the reference number and object type of the reference profile.

3. The reference identification and resolution method as set forth in claim 1, wherein the constrained selecting employs integer linear programming.

4. The reference identification and resolution method as set forth in claim 1, wherein the selecting is subject to further constraint that object text fragments paired with reference profiles of a given object type indicator be ordered in the document by their reference number.

5. The reference identification and resolution method as set forth in claim 1, further comprising:
   labeling the reference profiles with labels representative of textual content of text fragments matching the reference number and object type of the reference profile,
   wherein the assigning likelihood scores to candidate reference profile-candidate text fragment pairs includes computing pairwise scoring components indicative of textual similarity between reference profile labels and textual content of the candidate text fragments.

6. The reference identification and resolution method as set forth in claim 1, further comprising:
   generating an object types list for the document from the object type indicators of the reference profiles wherein the object type indicators of the reference profiles are derived endogenously from the document.

7. The reference identification and resolution method as set forth in claim 1, wherein the deriving of reference profiles is constrained by a pre-selected set of allowable object type indicators.

8. The reference identification and resolution method as set forth in claim 1, wherein the resolving further comprises:
   annotating the document with a hyperlink from the resolved reference to the object text fragment paired with the matching reference profile.

9. A document annotation or structuring system comprising:
   a reference identification and resolution module comprising a digital processor configured to identify reference text fragments in a document and associate referenced object text fragments in the document with the identified reference text fragments using a method comprising:
      identifying a set of candidate object text fragments from the document, each candidate object text fragment including at least a reference number, the set of candidate object text fragments including both object text fragments and reference text fragments, the identifying not differentiating between object text fragments and reference text fragments;
      deriving reference profiles from the set of candidate object text fragments, each reference profile including at least a reference number and an object type indicator;
      pairing reference profiles with object text fragments selected from the set of candidate object text fragments, each pair having a same reference number for the paired reference profile and the object text fragment, wherein the pairing includes:
         assigning likelihood scores to pairings of reference profiles and candidate object text fragments having matching reference numbers; and
         selecting the object text fragments for pairing with reference profiles based on the likelihood scores subject to a constraint that the pairings be one-to-one in which no reference profile is paired with more than one object text fragment and no object text fragment is paired with more than one reference profile;

matching reference text fragments in the document with reference profiles by reference number and object type; and associating matched reference text fragments with object text fragments paired with the matching reference profiles; and a document annotation or structuring module configured to annotate or structure the document based on the reference text fragments and referenced object text fragments output by the reference identification and resolution module.

10. The document annotation or structuring system as set forth in claim 9, wherein the selecting is subject to the further constraint that object text fragments selected for pairing with reference profiles of a same object type indicator be ordered in the document by their reference number.

11. The document annotation or structuring system as set forth in claim 9, further comprising:

labeling the reference profiles with labels representative of textual content of text fragments matching the reference number and object type of the reference profile, wherein the assigning of likelihood scores includes computing pairwise scoring components indicative of textual similarity between reference profile labels and textual content of the candidate object text fragments.

12. The document annotation or structuring system as set forth in claim 9, wherein the selecting is performed by linear programming subject to one or more constraints including at least said constraint that the pairings be one-to-one.

13. The document annotation or structuring system as set forth in claim 9, wherein the document annotation or structuring module is configured to annotate or structure the document by defining hyperlinks between reference text fragments and referenced object text fragments output by the reference identification and resolution module.

14. The document annotation or structuring system as set forth in claim 13, further comprising:

a user interface having a display for displaying the document with annotations including the defined hyperlinks and one or more input devices for receiving annotations input by a user, said user interface enabling said user to at least (i) modify or delete the defined hyperlinks and (ii) add new intradocument hyperlinks.

15. The document annotation or structuring system as set forth in claim 9, wherein the document annotation or structuring module is configured to structure the document by (i) defining objects corresponding to the reference profiles which are ordered within the document by the reference numbers of the reference profiles and typed based on the object type identifiers of the reference profiles and (ii) linking the defined objects with the associated reference text fragments based on the associating performed by the reference identification and resolution module.

16. A non-transitory storage medium storing instructions executable by a digital processor to perform reference identification and resolution to identify reference text fragments in a document and associate referenced object text fragments in the document with the identified reference text fragments using a method comprising:

identifying a set of candidate object text fragments from the document wherein each candidate object text fragment includes at least a reference number, the set of candidate text object fragments including both object text fragments and reference text fragments, the identifying not differentiating between object text fragments and reference text fragments;

abstracting reference profiles from the set of candidate object text fragments, each reference profile specifying at least a reference number and an object type identifier;

pairing a reference profile with an object text fragment of the set of candidate object text fragments containing that contains the reference number of the reference profile;

repeating the pairing to associate reference profiles with object text fragments wherein the pairing and repeated pairing are performed substantially simultaneously based on (i) likelihood measures of candidate pairings of reference profiles and text fragments of the document and (ii) constraints including at least a constraint that each reference profile and each object text fragment belong to only one pairing;

associating a reference text fragment of the set of candidate object text fragments satisfying one of the reference profiles with the object text fragment paired with the satisfied reference profile; and repeating the associating to associate reference text fragments of the document with object text fragments.

17. The storage medium as set forth in claim 16, wherein at least some abstracted reference profiles further specify a label representative of textual content of text fragments of the document that match the reference number and object type of the reference profile, and the pairing and repeated pairing is based at least in part on comparison of the label of the reference profile with textual content of the object text fragment.

18. The storage medium as set forth in claim 16, wherein the pairing and repeated pairing are performed using integer linear programming to optimize the likelihood measures of candidate pairings of reference profiles and text fragments of the document subject to the constraints including at least the constraint that each reference profile and each object text fragment belong to only one pairing.

19. The document annotation or structuring system as set forth in claim 9, further comprising:

generating an object types list for the document from the object type indicators of the reference profiles obtained from the document by the identifying and deriving operations without being limited to a list of allowed object type indicators.

20. The document annotation or structuring system as set forth in claim 9, further comprising:

generating an object types list for the document from the object type indicators of the reference profiles, the object types list being generated endogenously from the document using an occurrence threshold.

* * * * *